United States Patent [19]

Botsolas

[11] Patent Number: 4,553,308

[45] Date of Patent: Nov. 19, 1985

[54] PIPE FITTING COVER AND METHOD FOR COVERING PIPE FITTINGS

[75] Inventor: Chris J. Botsolas, St. Petersburg, Fla.

[73] Assignee: Carol Bostolas, St. Petersburg, Fla.

[21] Appl. No.: 535,911

[22] Filed: Sep. 26, 1983

[51] Int. Cl.⁴ ............... B23P 11/02; F16L 9/00; F16L 9/14

[52] U.S. Cl. .............................. 29/450; 138/178; 138/149; 138/157

[58] Field of Search ............ 29/450; 285/13, 210; 138/149, 157, 178

[56] References Cited

U.S. PATENT DOCUMENTS

| | | | |
|---|---|---|---|
| 276,044 | 4/1883 | Holt . | |
| 1,704,760 | 3/1929 | Parker . | |
| 2,470,499 | 5/1949 | Lapp | 285/210 |
| 2,756,172 | 7/1956 | Kidd | 154/44 |
| 3,153,546 | 10/1964 | Dunn | 285/13 |
| 3,177,528 | 4/1965 | Flower et al. | 18/36 |
| 3,222,777 | 12/1965 | Rutter et al. | 29/526 |
| 3,307,590 | 3/1967 | Carlson | 138/149 |
| 3,321,924 | 5/1967 | Liddell | 61/54 |
| 3,495,629 | 2/1970 | Botsolas et al. | 138/149 |
| 3,631,898 | 1/1972 | Harley | 138/157 |
| 3,732,894 | 5/1973 | Botsolas | 138/178 |

OTHER PUBLICATIONS

Zeston Inc. Catalog—Method of Insulating Groove Type Mechanical Pipe Coupling.
Speed-14 Line Manufacturing Company Inc. Catalog.
Zeston Inc. Catalog—Pre-Molded Hi-Lo ® Temp-PVC Insulation Fittings.
Zeston Inc. Brochure—Manville Insulation System IND-4004.

Primary Examiner—Howard N. Goldberg
Assistant Examiner—Steven Nichols
Attorney, Agent, or Firm—Hedman, Gibson, Costigan & Hoare

[57] ABSTRACT

A pipe covering for flanged insulated pipes. The pipe coverings are characterized by the presence of toroidal protrusions and tapered sections extending outwardly from the protrusions.

20 Claims, 9 Drawing Figures

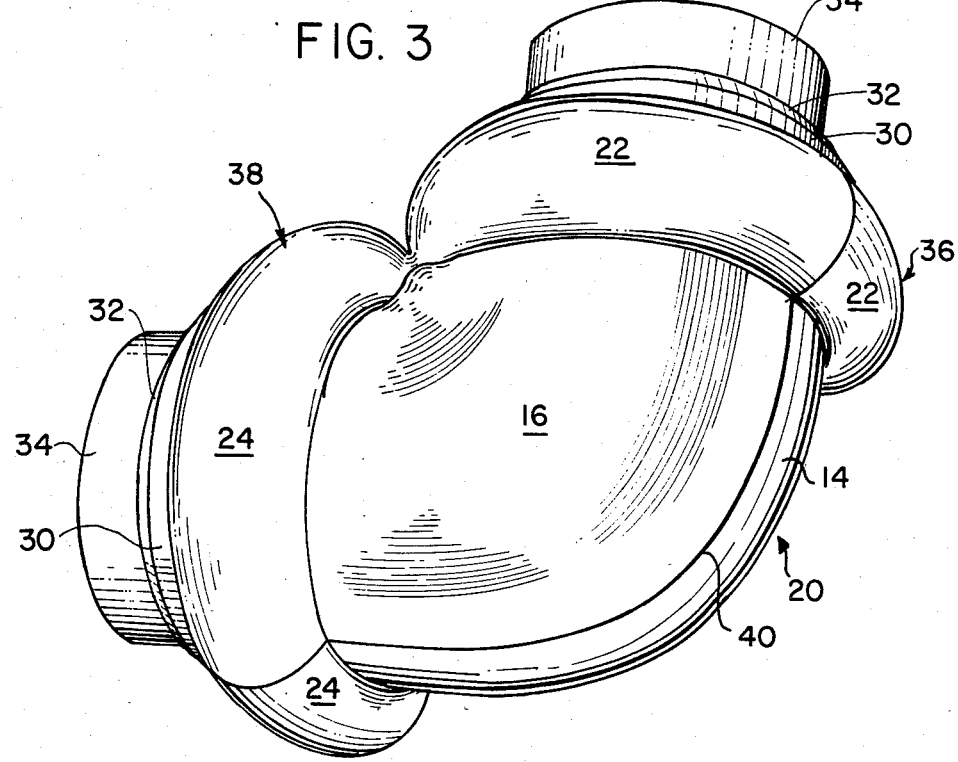
FIG. 3
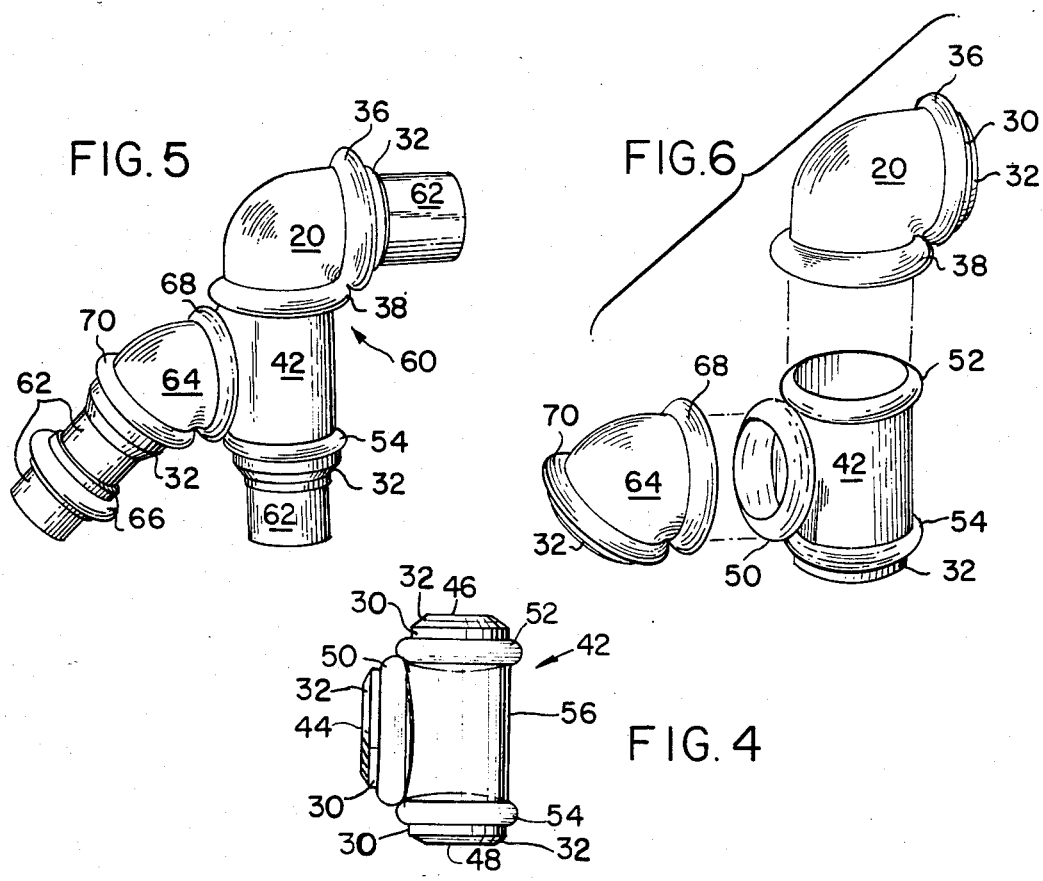
FIG. 5
FIG. 6
FIG. 4

FIG. 7
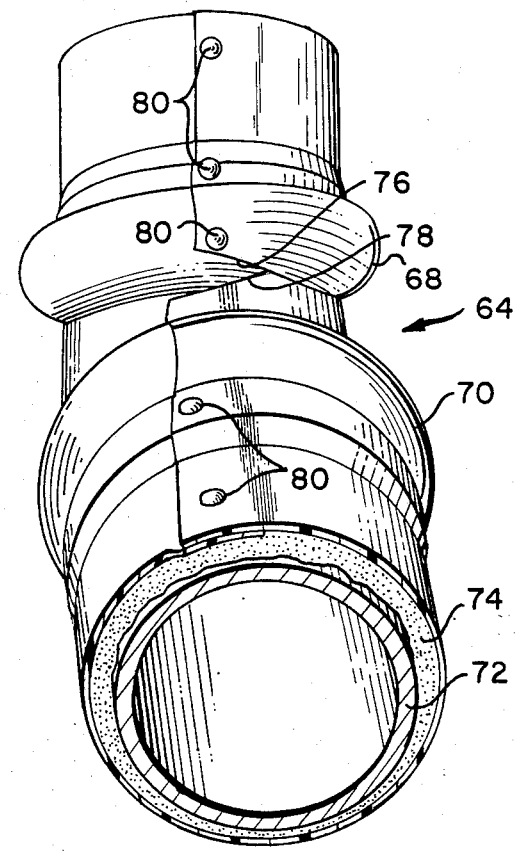
PRIOR ART
FIG. 8
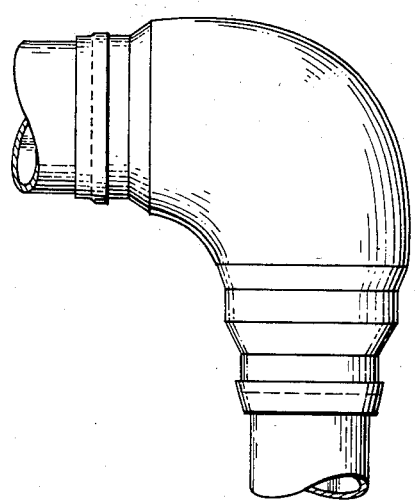
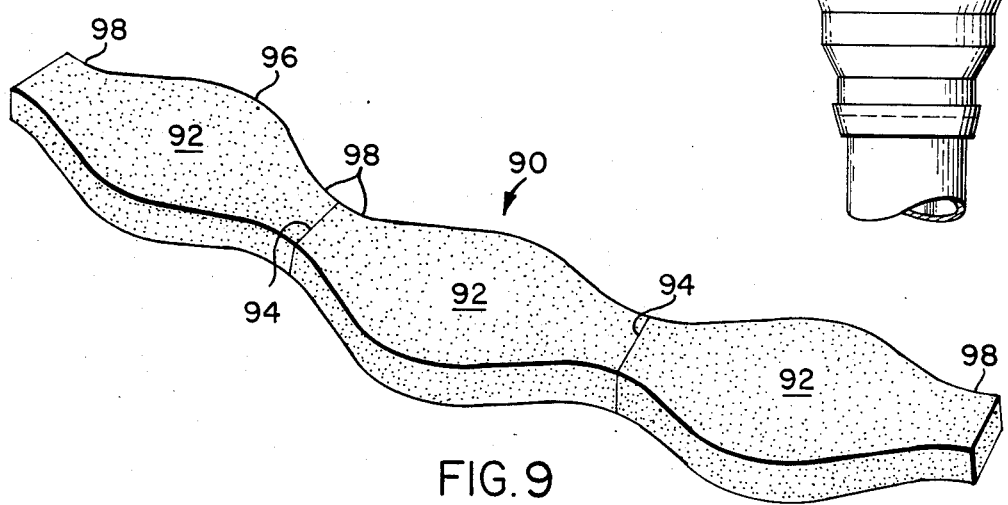
FIG. 9

PIPE FITTING COVER AND METHOD FOR COVERING PIPE FITTINGS

BACKGROUND OF THE INVENTION

1. Field of the Invention

This invention relates generally to pipe fitting covers and a process for covering pipe fittings. More specifically, the invention relates to pipe fitting covers designed specifically to cover fitting members joined by clamps, flanges, or other devices that protrude from the contour of the piping assembly.

2. Description of the Prior Art

In virtually every instance wherein a cold or hot fluid is being conveyed through piping, insulation of the piping is desirable. It has long been the custom to wrap or place the insulation over the exterior of the piping and to cover the insulation. Insulated piping is covered to further improve the insulation and to enhance appearance.

Early efforts at insulating piping were directed to spreading layers of cement in place by hand on the piping and the pipe fittings and then adhering a fabric thereover followed by additonal coating layers. This procedure was expensive and time consuming.

Thereafter, aluminum and plastic covers for both the piping and the various fittings such as elbows, tees, valves and couplings were provided both with insulating material secured therein and without any insulation. In the instances wherein the insulating materials are adhered to the fitting covers, the insulation and fitting are joined in place at the same time. In those instances where the cover is separate from the insulation, the insulation is usually first formed about the piping and the pipe fittings and thereafter the aluminum or plastic covers are secured over the insulation.

The problem of covering flanged fittings or piping at any point at which a protrusion extends from the streamline surface of a piping assembly has been dealt with for many years. Further, in recent years, mechanical grooved type externally coupled fittings, such as manufactured by VICTAULIC ® Co. and others have been used more frequently in piping assemblies that require insulation. An illustration of an effort to achieve a fitting cover capable of covering and accommodating insulation over the flanged or protruding portions of piping, is seen in U.S. Pat. No. 3,732,894 (Botsolas, May 15, 1973). Therein, the elbow fitting cover is sized to have a uniform inner and outer radius defined by the flange or protrusion on the piping. Further, step collars on the ends of the fitting covers are provided with this cover to facilitate joining the elbow cover or other fitting cover to the pipe extending from the fitting. Similar fitting covers with multiple stepped reducers such as seen in U.S. Pat. No. 153,546 (Dunn, Oct. 1964) are also known.

Another effort at covering fittings joined by protruding flanges is illustrated by the fitting covers as seen in U.S. Pat. No. 3,732,894 (Botsolas; May 15, 1973). Both molded fiberglass fittings and urethane foam fittings are used under the PVC cover. Again, the molded fittings and covers have a uniform outer radius and a uniform inner diameter which are a function of the size of the protrusion or flange outside diameter.

Still another effort at dealing with the problem of covering flanges with insulation is shown in U.S. Pat. No. 3,631,898 (Harley, Jan. 4, 1972). The approach taken in the Harley Patent is one wherein half sections of rigid covering material are machined by gringing the rigid insulation internally to the contour of the fitting to be covered. Again, the outer radius of the fitting is essentially constant and uniform and requires a cover member, usually of tough vinyl, again configured to the contour of the insulation. These prior art covers fail to provide an efficient covering for flanged fittings wherein ease of joining adjacent fittings can be attained, nor do these prior art covers provide a single cover that can cover a variety of pipe insulation thicknesses.

SUMMARY OF THE INVENTION

It is an object of the present invention to provide efficient and economical insulation of flanged fitting members in a piping assembly.

It is another object of the present invention to provide a single fitting cover that has the capacity and latitude to cover a variety of diameters of flanged pipe insulation thicknesses used with the same size flanged pipe fitting.

It is another and further object of the present invention to provide a fitting cover that will enable simple secure and efficient covering of adjacent fittings.

It is a further object of the present invention to provide fitting covers which have the capacity to overlap and provide secure attachment over adjacent fittings secured by flanges.

To this end, a fitting cover has been provided which is, in essence, formed of two half sections, having on each end toroidally contoured sections. The fitting further includes tapered connecting members which extend from the contour and in which the fitting cover terminates.

A full complement of covers such as 90° elbows, 45° elbows, tee members, and any other fitting in which flanged connections are found, lend themselves to the design of the present invention.

In practice, the cover can be installed over a large range of insulation thicknesses due to the capacity of the covers, by virtue of its inherent design, to be compressed from the intended original design size to smaller sizes. When adjacent fitting members are found in an assembly, the design of the present invention enables overlapping fit of the protruding members to thereby provide an effective efficient and simplified sealing procedure.

DESCRIPTION OF THE DRAWING

The present invention will be better understood when viewed with the following drawings wherein:

FIG. 3 is an isometric view of a ninety degree elbow cover of the present invention covering the fitting of FIG. 1;

FIG. 4 is an elevational view of the Tee covering of the present invention;

FIG. 5 is an assembly of ninety degree elbow, tee, forty-five degree elbow and coupling all covered with like fitting covers of the present invention;

FIG. 6 is an exploded view of three insulation covers of FIG. 5;

FIG. 7 is an isometric view from the inside radius of a forty-five degree elbow cover of the present invention secured to a forty-five degree elbow;

FIG. 8 is a prior art ZESTON 90° fitting; and

FIG. 9 is a continuous string of elbow insulation which has been developed for use with the elbow covers of the present invention.

DESCRIPTION OF THE PREFERRED EMBODIMENT

The present invention is suitable for use in any piping installation wherein protrusions occur. The protrusions typically found are flanged fitting connections used to join various fittings either with each other or with straight piping of the assembly.

Figure 1:
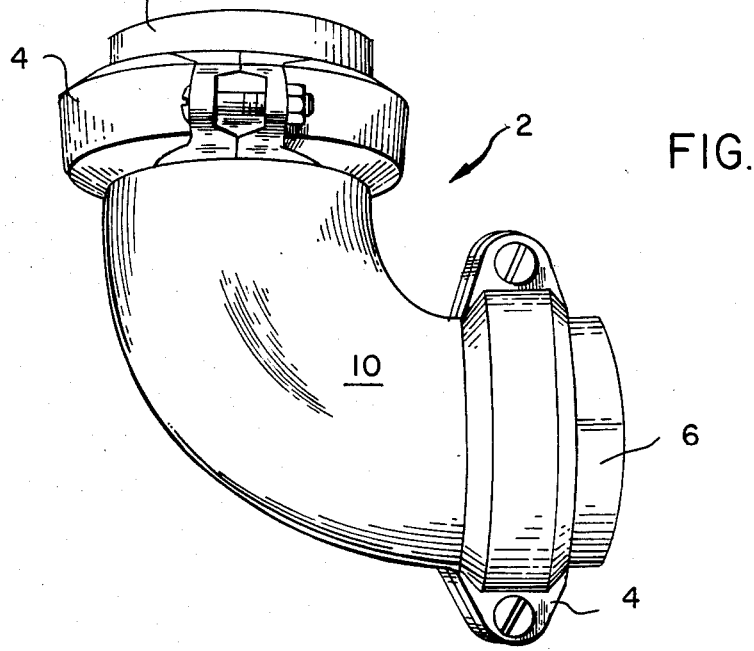
FIG. 1 is an isometric view of a portion of a piping assembly joined by flanged connections such as a VICTAULIC fitting.

As best seen in FIG. 1, an uninsulated piping assembly is shown with conventional mechanical groove type flange connecting members 4 joining pipes 6 and 8 with a ninety degree elbow 10. In practice, it is necessary to insulate the pipes 6 and 8 and the elbow fitting 10. It is necessary also to effect the insulation with a simple, expedient and sure fitting which can provide insulation in the proper amount over the piping, the fitting and the flanged connecting members.

Figure 2:
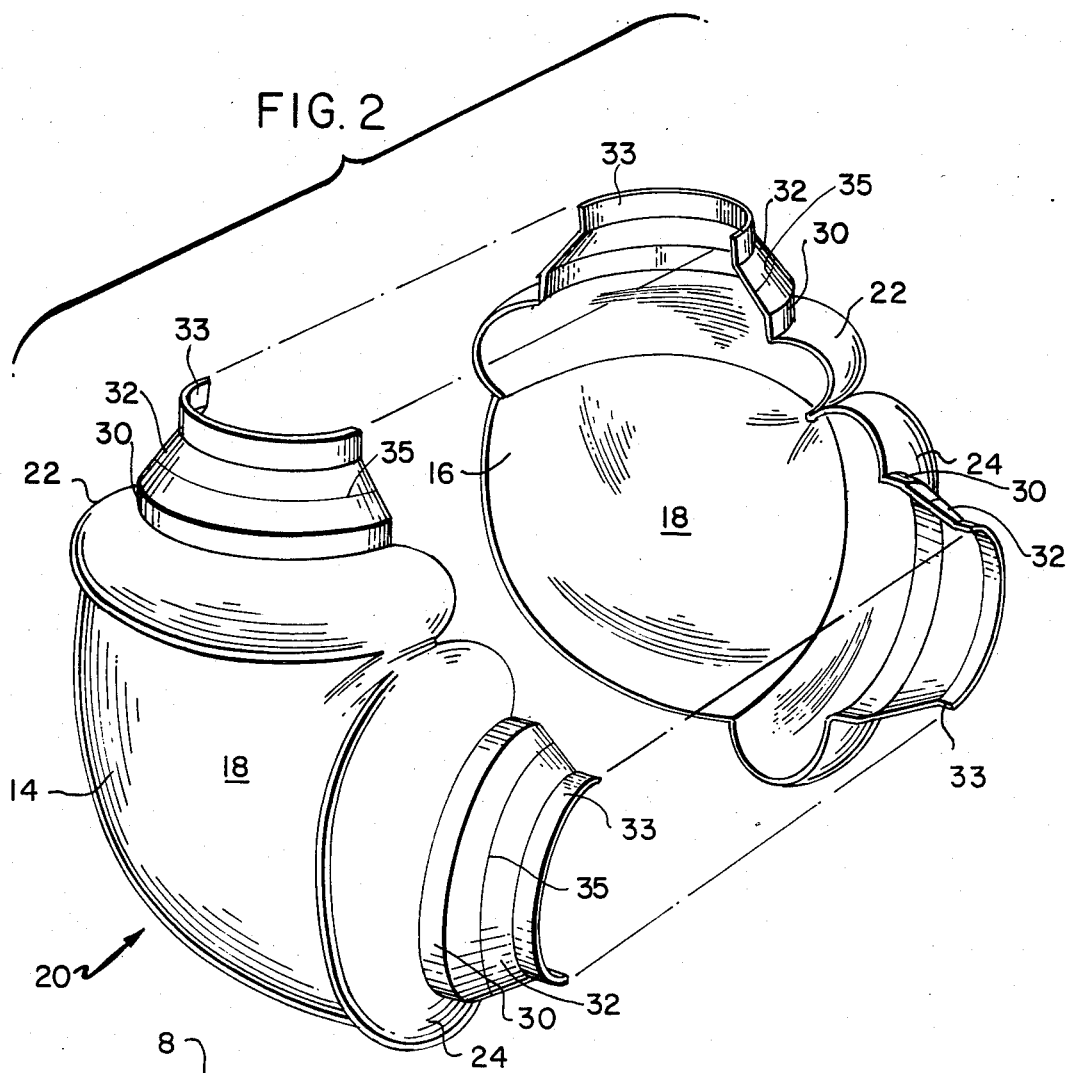
FIG. 2 is an exploded isometric view of two half-sections that combine to form the ninety degree elbow of the present invention.

To this end, the fitting of the present invention has been created. As best seen in FIG. 2, two half-sections 14 and 16 are provided to afford a ninety degree elbow 20 of the present invention. The half-sections 14 and 16 have a contoured elbow body portion 18 on which protrusions 22 and 24 are formed near each end. As further shown in FIG. 2, half-sections 14 and 16 are provided with a body portion 18 and torodial protrusions 22 and 24, each torodial half section 14 and 16 being formed of a single unitary piece comprising the body member 18 and the toroidal protrusions 22 and 24. An essentially flat continuation 30 extends beyond the protrusions 22 and 24 and thereafter a tapered extension 32 is provided at each end. Flat continuations 33 in which elbow cover 20 terminates are provided beyond the tapered extensions 32.

As seen in FIG. 3 the completely assembled ninety degree elbow cover 20 is shown with pipe covering 34 on a piping assembly. The elbow cover 20 is formed by joining the two half-sections along the outside radius 40 of the formed cover 20. Slight overlapping of one section 14 within the other section 16 provides a suitable arrangement for joining the half-sections. In practice, it has been found that the half sections can be connected by any reliable bonding or joining means. For example, if the half-sections 14 and 16 are formed of Polyvinyl Chloride (PVC), a commercial PVC cement or rubber contact adhesive can be used to join the two half-sections 14 and 16. Practice has taught that the two half-sections 14 and 16 can be best joined along the outer radius 40 only in the region between the protrusions 22 and 24 to facilitate opening of the cover 20 along the inner radius to fit over the fitting for which it is designed.

When the two half-sections 14 and 16 are joined the protrusions 22 and 24 of one half-section 14 fit nestingly within the protrusions 22 and 24 of the half-section 16 to form toroidal members 36 and 38. As best seen in FIGS. 3, 5 and 6, the toroidal protrusions 36 and 38 are individually distinct and discrete from each other to enable an overlapping fit whereby a toroidal protrusion, for example 36 or 38, can fit over a similarly configured toroidal protrusion on an adjacent elbow cover without one toroidal protrusion 36, 38 interferring with the other toroidal protrusion 36, 38. However, when a toroidal protrusion 36 or 38 is intended to fit over another toroidal protrusion on a similarly configured pipe fitting cover, all elements extending outwardly from the toroidal protrusion, such as the continuation 30, the tapered extension 32 and continuation 33 must be removed from the elbow cover to avoid interference with the toroidal protrusion being covered. The continuations 30 and the tapered extensions 32 of half section 14 fit within the continuations 30 and the tapered extensions 32 of the half section 16. Thus, a pipe fitting cover is configured in the shape of the fitting to be covered and is comprised of a body portion formed of mating body portions 18 and torodial protrusions 36 and 38 integrally formed with the body portion.

As a result of the design the formed fitting covers can be made of a variety of materials such as aluminum, or plastics; e.g. polypropylene or polyvinyl chloride. The resulting structure 20 is a semi-rigid, resilient fitting cover 20 having essentially the configuration of the fitting with toroidal members 36 and 38 to accommodate and fit over the flanges that attach the fittings. Thus, as previously indicated the cover 20 can be expanded by virtue of the opening (not seen) long the inner radius of the cover 20.

The contoured toroidal protrusions 36 and 38 of the fitting covers 20 enable overlapping fitting when adjacent tee and elbow members are found in a piping assembly.

The tapered extensions 32 facilitate tight secure fit around the covering for straight pipe and the continuations 33 provide a flat surface to bear on adjacent pipe covering. A score line 35 is formed around the tapered extensions at a diameter that coincides with the design diameter of the insulation to be covered. Practice has taught that the taper angle should range from twenty degrees to forty-five degrees with an angle of thirty-five degrees being the preferred angle. It has been found that the thirty-five degree taper will best accommodate Vinyl sealing tape, particularly when the tape is cut to fit an insulation thickness other than the anticipated design thickness.

As best seen in FIG. 4, a tee cover 42 of the present invention is shown in assembled form. Therein, by virtue of the fact that three openings 44, 46 and 48 are present in all tee fitting members, three toroidal sections 50, 52 and 54 are provided. In the tee cover 42, two identical half-sections again form the assembled member. The connection of the two tee half-sections is along the straight line 56 which is opposite the ninety degree opening 44 on the tee. The opening provided to expand the tee cover 42 to enable mounting on a fitting is through the ninety degree opening 44 opposite the joining line 56. Again, flat circular continuation members 30 and tapered extensions 32 are provided at each termination of the tee member.

As best seen in FIG. 5, an assembly of piping 60 is shown covered by various appropriate fitting covers of the present invention. The cover members are comprised of straight piping covers 62, a ninety degree elbow cover 20, a tee cover 42, a forty-five degree cover 64 and a coupling 66. The covering process can be effected in many ways. However when adjacent flanged fittings are covered with the covers of this invention the flat continuation members 30, the tapered extensions 32 and the continuations 33 are trimmed from the overlapping covers.

In the installation shown in FIG. 5, the pipe insulation is first applied and then the fittings are wrapped with blanket-type insulation (not shown). Thereafter, the tee cover 42 is trimmed of all material extending beyond the toroidal protrusions 52 and 50 to be covered and placed over the fitting with the toroidal protrusion covering the flanges. Next, the elbow cover 20 is trimmed to remove the continuation 30 and the tapered extension 32 extending beyond the toroidal protrusion 38, to enable the toroidal protrusion 38 to fit over the toroidal protrusion 52 on the tee cover 42. The forty-five degree elbow 64 is trimmed to remove the continuation member 30 and tapered extension 32 beyond the toroidal protrusion 68 fitting over the toroidal protrusion 50 on the tee cover 42. The continuation 30 and extensions 32 adjacent the toroidal protrusions that do not fit over mating toroidal protrusions are intended to fit tightly around the pipe covering 62 which each engage. Thus, depending on the circumstances, the tapered extensions may be cut along a line 35 which indicates the diameter of the desired design insulation. Finally, the coupling cover 66 which is in essence a single toroidal protrusion formed of two half-sections, is installed.

FIG. 6 shows the exploded view of the covers of FIG. 5, with the continuations 30 and tapered extension 32 either present or absent as required by this particular installation.

The forty-five degree elbow cover 64 is shown in FIG. 7 with the inner radius presented. Fairing and trimming is shown by the bevel cuts 76 and 78 on the toroidal protrusion 68. The cover 64 is held in place by pins 80 that transpierce the overlapping edges of the cover 64 along the inner radius.

As best seen in FIG. 8, a prior art ZESTON elbow is shown with the constant outer radius rather than toroidal protrusions to accommodate pipe flanges. Thus, the prior art fitting is incapable of providing overlapping joinder of associated fittings.

Any conventional insulation is suitable for use with the covers of this invention. However, fiberglass insulation 90 cut in various sizes but held together in a single insert string by the inherent structure of the fibers of the fiberglass has been developed to use with the covers of the invention. The separate insulation blankets 92 of fiberglass shown in FIG. 9 can be separated by simply tearing at the score lines 94 to provide individual coverings or blankets which fit within the elbow or tee covers of the present invention. The larger width section 96 of each blanket 92 is placed on the outside radius of an elbow and the ends 98 wrapped over the elbow, to meet on the inner radius. A principle benefit of a connected string of insulation blankets 92 is the convenience afforded to the installer.

Further, if multiple layers of insulation blankets are required, the connected string can be continuously wrapped around the fitting until the desired insulation thickness results.

What is claimed:

1. A pipe fitting cover for a flanged pipe fitting comprising a resilient body member having a body portion fored to generally conform to the shape of the pipe fitting to be covered and a toroidal protrusion portion unitary with the body portion and extending outwardly from the cover body portion at the location in alignment with each flange on the pipe fitting to be covered each said toroidal protrusion being discrete from any other toroidal protrusion on said pipe fitting cover whereby, each said toroidal protrusion portion can overlap a similarly configured toroidal protrusion portion on an adjacent pipe fitting cover.

2. A pipe fitting cover as in claim 1 further comprising a continuation extending from the cover beyond each toroidal protrusion which continuation are configured the same and sized with the same diameter as the cover body member;

said continuation being adapted to be selectively removed to enable the toroidal protrusions to overlap a similarly configured toroidal protrusion on an adjacent pipe fitting cover.

3. A pipe fitting cover as in claim 1 further comprising a tapered extension extending from the cover beyond toroidal protrusion, which tapered extension tapers convergently in the direction of a smaller diameter than the diamter of the cover body member;

said tapered extensions being adapted to be selectively removed to enable the toroidal protrusions to overlap a similarly configured toroidal protrusion on an adjacent pipe fitting cover.

4. A pipe fitting cover as in claim 2 further comprising tapered extensions extending from each continuation, which tapered extension tapers convergently in the direction of a smaller diameter than the diameter of the cover body member;

said continuations and said tapered extensions being adapted to be selectively removed to enable the toroidal protrusions to overlap a similarly configured toroidal protrusion on an adjacent pipe fitting cover.

5. A pipe fitting cover as in claim 4 wherein the taper of each tapered extension converges to a smaller diameter at an angle between twenty degrees and forty-five degrees.

6. A pipe fitting cover as in claim 4, wherein the taper of each tapered extension converges to a smaller diameter at an angle of thirty-five degrees.

7. A pipe fitting cover as in claim 4 further comprising a continuation of constant diameter extending outwardly from each of the tapered extensions;

said continuations, said tapered extensions, and said continuations of constant diameter being adapted to be selectively removed to enable the toroidal protrusions to overlap a similarly configured toroidal protrusion on an adjacent pipe fitting cover.

8. A pipe fitting cover as in claim 4 further comprising a score line on the tapered extensions at a location which is the desired diameter for the insulation being covered.

9. A pipe fitting cover as in claim 1 wherein the pipe fitting to be covered is an elbow; the cover is formed in the configuration of an elbow and two toroidal protrusions are formed on the cover, one at each end of the elbow.

10. A pipe fitting cover as in claim 1 wherein the pipe fitting cover to be covered is a Tee; the cover is formed in the configuration of a Tee and three toroidal protrusions are formed on the cover, one at each opening of the Tee.

11. A pipe fitting cover as in claim 1 wherein the cover is formed of two substantially identical unitary half-sections.

12. A pipe fitting cover as in claim 11 wherein the two half-sections are secured to each other along the outer radius in the region between the toroidal protrusions 13. A pipe fitting cover as in claim 1 formed entirely of polyvinyl chloride.

14. A pipe fitting cover as in claim 1 formed of aluminum.

15. A pipe fitting cover as in claim 3 wherein the cover is formed of two substantially identical half-sections secured together at the outer radius in the region between the toroidal protrusions.

16. A process for covering a pipe fitting having flanged connecting members comprising;
   (a) wrapping insulation around the fitting and the flanges;
   (b) expanding a pipe fitting cover comprised of a resilient body having a body portion formed to generally conform to the shape of the pipe fitting to be covered and a toroidal protrusion portion unitary with the body portion and extending outwardly from the cover body portion at the location in alignment with each flange on the pipe fitting to be covered each said toroidal protrusion being discrete from any other toroidal portrusion on said pipe fitting cover whereby, each said toroidal protrusion portion can overlap a similarly configured toroidal protrusion portion on an adjacent pipe fitting cover, wherein the inner radius is unconnected and the outer radius is connected only in the region between the toroidal protrusions, to the point wherein the inside radius is open a distance greater than the insulated fitting;
   (c) placing the expanded pipe fitting cover over the insulated fitting with the toroidal protrusions aligned with the flanges;
   (d) closing the inside radius to the point wherein the facing sections of the inner radius overlap; and
   (e) fixedly securing the facing sections of the inner radius to each other.

17. A process as in claim 16 wherein the pipe fitting being covered is in a piping assembly in which the fitting is directly connected to pipes that have been covered with insulation and pipe covering and in which the cover has tapered extensions extending beyond the toroidal protrusions, further comprising the step of compressing the cover to urge the tapered extensions against the adjacent pipe cover to form a positive connection between the tapered extensions and the adjacent pipe covers.

18. A process as in claim 17 further comprising the step of trimming the tapered extensions along a line designed to provide the desired design diameter of the insulation over the piping being covered.

19. A process as in claim 16 further comprising the steps of first separating individual blanket insulation from a continuous string of insulation and using the separated individual blankets to wrap the fitting with insulation.

20. A process as in claim 16 wherein adjacent flanged fittings are insulated and covered with a first and second cover each comprised of a resilient body having a body portion formed to generally conform to the shape of the pipe fitting to be covered and a toroidal protrusion portion unitary with the body portion and extending outwardly from the cover body portion at the location in alignment with each flange on the pipe fitting to be covered each said toroidal protrusion being discrete from any other toroidal protrusion on said pipe fitting cover whereby, each said toroidal protrusion portion can overlap a similarly configured toroidal protrusion portion on an adjacent pipe fitting cover, and extensions extending beyond the toroidal protrusions wherein the inner radius is unconnected and the outer radius is connected only in the region between the toroidal protrusions, comprising the further steps of: trimming the material extending beyond the toroidal protrusion of a first cover; placing the cover over a fitting with the toroidal protrusions covering the flanges; trimming the material extending beyond the toroidal protrusion of a second cover; placing the second cover over a fitting adjacent to the first fitting with the toroidal protrusion from which the material extending therefrom has been trimmed over the toroidal protrusion of the first cover from which the material extending therefrom has been trimmed.

* * * * *

UNITED STATES PATENT AND TRADEMARK OFFICE
CERTIFICATE OF CORRECTION

PATENT NO. : 4,553,308                      Page 1 of 2

DATED : November 19, 1985

INVENTOR(S) : Chris J. Botsolas

It is certified that error appears in the above—identified patent and that said Letters Patent is hereby corrected as shown below:

Title page, Item No. [73] change "Carol Bostolas" to --Carol Botsolas--.

Column 1, line 24, change "additonal" to --additional--;

line 55, change "U.S. Pat. No. 153,546" to --United States Letters Patent No. 3,153,546--.

Column 3, line 32, change "torodial" to --toroidal--;

line 33, change "torodial" to --toroidal--;

line 68, change "interferring" to --interfering--.

Column 4, line 24, change "long" to --along--.

Column 5, line 62, change "fored" to --formed--.

Column 6, line 6, change "continuation" to --continuations--;

line 9, change "continuation" to --continuations--;

UNITED STATES PATENT AND TRADEMARK OFFICE
CERTIFICATE OF CORRECTION

PATENT NO. : 4,553,308

DATED : November 19, 1985

INVENTOR(S) : Chris J. Botsolas

Page 2 of 2

It is certified that error appears in the above—identified patent and that said Letters Patent is hereby corrected as shown below:

Column 6, line 15, between "beyond" and "toroidal" add --each--;

line 17, change "diamter" to --diameter--;

line 68, after "protrusions" add --.--.

Signed and Sealed this

Eighteenth Day of March 1986

[SEAL]

Attest:

DONALD J. QUIGG

Attesting Officer

Commissioner of Patents and Trademarks